March 17, 1931. H. H. BERGMAN 1,796,881
HAY SLING
Filed Dec. 23, 1929

INVENTOR:
Harold H. Bergman
BY David E. Carlsen
ATTORNEY.

Patented Mar. 17, 1931

1,796,881

UNITED STATES PATENT OFFICE

HAROLD H. BERGMAN, OF FERGUS FALLS, MINNESOTA

HAY SLING

Application filed December 23, 1929. Serial No. 416,043.

My invention relates to improvements in hay-slings and the main object is to provide certain re-enforcing or strengthening means for the end parts of the ropes of such slings, such means preventing the ropes from becoming disengaged from the metal loops or other means to which they are connected.

In the use of hay-slings it has hitherto been common to have considerable difficulties with such rope ends because of wear and tear thereon, such rope ends normally being clamped together by means such as wire-clips which spread, wear out or weaken after being used a while and thus rendering the entire sling useless until repaired.

The construction and use of my device are hereinafter fully set forth, reference being had to the accompanying drawing, in which,—

Figure 1:
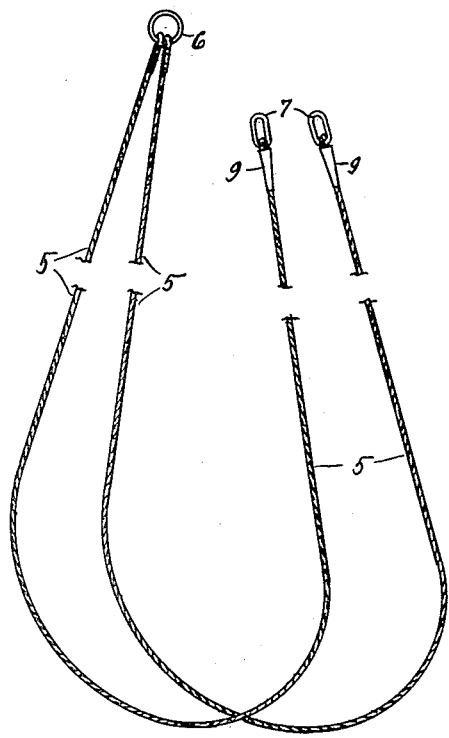
Fig. 1 is a perspective view of a two-rope hay sling with my improved rope-end shielding and strengthening means shown on the free ends of the two ropes, the other two ends being connected to one ring.
Figures 2, 3:
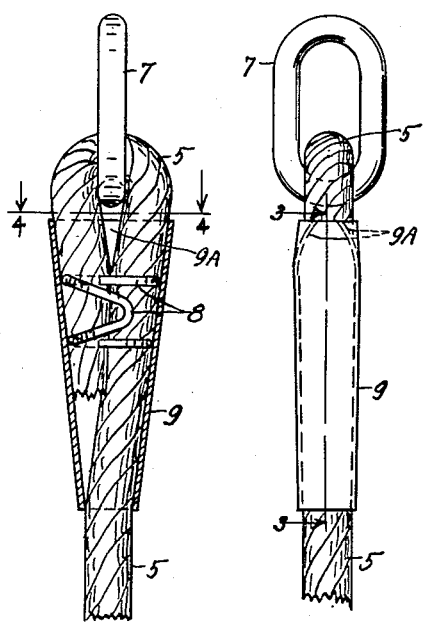
Fig. 2 is a side elevation, in enlarged scale, of either of the free ends of the ropes shown in Fig. 2.
Fig. 3 is an elevation of Fig. 2 looking toward the latter as from the left, the sleeve of my device being shown in longitudinal section about as on line 3—3 in Fig. 2.

Referring to the drawing by reference numerals, I have illustrated in Fig. 1 a common type of hay sling with two ropes 5, two adjacent ends of which are secured in a ring 6 and their opposite ends secured each in a link-like metal ring 7 by simply making a half loop thereon and doubling the rope therebelow, see Figs. 2 and 3, said doubled rope being clamped rigidly together by one or more suitable wire clamps 8 encircling the two ropes. The type of clamp shown is a single-piece wire though it may be advisable to use other types such as a flat metal ring (not shown). In the use of the hay sling the ropes 5 after having been used to raise a quantity of hay within their looped parts, are withdrawn by unfastening the links 7 from the lifting means (not shown) then exerting a pull on ring 6, drawing the ropes out from under the hay. Hitherto, because of the weight of hay handled and direct friction on the parts of the ropes connected to loops 7, the clamping means 8 have been caused to spread, the ropes straightening out and the links 7 lost, requiring frequent repairs which it is the object of my improvement to overcome.

For this purpose I provide for each rope connection to the links 7 or ring 6, a heavy sheet metal tapered sleeve 9, the small end of which is of a size to permit the rope 5 to be passed readily through it, the wider part of the sleeve extending toward the doubled end of the rope engaging either a link 7 or the ring 6.

Figure 4:
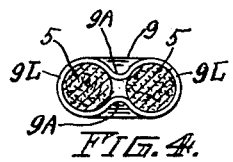
Fig. 4 is a sectional view as at line 4—4 in Fig. 3 showing mainly the top end of my sleeve device.

The sleeve is tapered as described so as to be slipped upwardly along the rope toward its looped part to completely surround the doubled, clamped part of the rope engaging said parts frictionally and positively preventing the clamp means 8 from spreading. The larger end of the sleeve may be thus positioned quite near to member 7 or 6 as the case may be, the shape of said end being an elongated ellipse through which the two bights of rope extend downwardly toward their clamped parts in spaced relation at said opening. To prevent the sleeve from moving on the rope, its opposite walls at the upper opening are bent inwardly toward each other, as at 9A in Figs. 2, 3 and 4, said inwardly projected parts bending the metal in between the adjacent rope parts to form two nearly circular rope engaging loops 9L of the upper end of the sleeve (see Fig. 4).

The simplicity and effectiveness of my improved hay-sling rope means will now be fully understood. Obviously, the said means are applicable to other devices than hay slings but has been found particularly useful for the particular purpose described.

I claim:

A rope holding device for hay-slings and the like in which a half loop of the rope is engaged in a metal loop or link member and doubled upon itself adjacent such member and having means clamping said doubled rope parts together; said device comprising an elongated, tapered sleeve adapted to be slidably moved on the rope with its larger end to be passed over the doubled, clamped rope parts toward the metal member engaged thereby to frictionally engage and inclose said parts of the rope, the larger end of said sleeve is of elongated elliptical form and the opposite walls thereof intermediate the ends adapted to be bent inwardly toward each other to frictionally engage the inner adjacent parts of the two bights of rope extending through said larger end of the sleeve.

In testimony whereof I affix my signature.

HAROLD H. BERGMAN.